United States Patent
Opitz et al.

(10) Patent No.: US 6,836,780 B1
(45) Date of Patent: Dec. 28, 2004

(54) METHOD AND SYSTEM FOR ACCESSING DATA IN LEGACY APPLICATIONS

(75) Inventors: Scott Opitz, Sellersville, PA (US); Alex Elkin, Acton, MN (US)

(73) Assignee: Jacada, Ltd., Atlanta, GA (US)

( * ) Notice: Subject to any disclaimer, the term of this patent is extended or adjusted under 35 U.S.C. 154(b) by 0 days.

(21) Appl. No.: 09/551,704

(22) Filed: Apr. 18, 2000

Related U.S. Application Data (60) Provisional application No. 60/151,842, filed on Sep. 1, 1999.

(51) Int. Cl.⁷ .............................................. G06F 17/30
(52) U.S. Cl. ............................ 707/104.1; 707/3; 707/2; 707/4; 707/102
(58) Field of Search .......................... 358/1.16; 345/589, 345/744, 853; 707/200, 103 R, 203, 205, 1; 709/246, 223; 711/162

(56) References Cited

U.S. PATENT DOCUMENTS

| | | | | |
|---|---|---|---|---|
| 5,533,175 A | * | 7/1996 | Lung et al. | ................. 358/1.16 |
| 5,754,830 A | | 5/1998 | Butts et al. | |
| 5,787,433 A | | 7/1998 | Plotkin et al. | |
| 5,857,194 A | | 1/1999 | Kelliher et al. | |
| 5,914,713 A | | 6/1999 | Nario et al. | |
| 5,940,075 A | | 8/1999 | Mutschler, III et al. | |
| 5,958,008 A | * | 9/1999 | Pogrebisky et al. | ........ 709/223 |
| 5,974,430 A | | 10/1999 | Mutschler, III et al. | |
| 6,046,747 A | * | 4/2000 | Saunders et al. | ........... 345/582 |
| 6,052,685 A | | 4/2000 | Eastwick et al. | |
| 6,131,183 A | | 10/2000 | Tyler | |
| 6,157,936 A | | 12/2000 | Mutschler, III et al. | |
| 6,237,006 B1 | * | 5/2001 | Weinberg et al. | ....... 707/103 R |
| 6,252,591 B1 | * | 6/2001 | Dockweiler et al. | ........ 345/744 |
| 6,329,985 B1 | * | 12/2001 | Tamer et al. | ............... 345/853 |
| 6,341,341 B1 | * | 1/2002 | Grummon et al. | .......... 711/162 |
| 6,385,626 B1 | * | 5/2002 | Tamer et al. | ............... 707/203 |
| 6,434,681 B1 | * | 8/2002 | Armangau | .................. 711/162 |
| 6,490,594 B1 | * | 12/2002 | Lomet | ........................ 707/200 |
| 6,510,468 B1 | * | 1/2003 | Hayne | ........................ 709/246 |
| 6,542,909 B1 | * | 4/2003 | Tamer et al. | ............... 707/205 |
| 2003/0130986 A1 | * | 7/2003 | Tamer et al. | .................. 707/1 |

* cited by examiner

*Primary Examiner*—Frantz Coby
(74) *Attorney, Agent, or Firm*—Volentine Francos & Whitt, PLLC (57) ABSTRACT

A method and apparatus is presented for mapping legacy application data. The mapping process consists of trail recording, mapping, and template creation. In the trail recording phase, user interaction with the legacy application is recorded as a trail. Each trail consists of snapshots of every screen encountered, and all of the keystrokes entered by the user. After trail creation, maps of the legacy application are created by sorting the screen snapshots into screens. The sorting is done according to specific rules that are controlled by the end user. The default rules allocate snapshots according to the number, position, and location of the predefined fields found in the snapshots. Additional tags can be defined of alphanumeric text to help properly identify the screens. Templates are then created to allow direct access to the data found on the screens of the legacy application. Separate templates allow access to static fields and tabular fields. Methods are then defined to access particular data in the legacy application. One or more methods can then be defined as a service, which is compiled into a reusable software component.

24 Claims, 7 Drawing Sheets

METHOD AND SYSTEM FOR ACCESSING DATA IN LEGACY APPLICATIONS

This application claims the benefit of U.S. Provisional Application No. 60/151,842, filed Sep. 1, 1999.

FIELD OF THE INVENTION

The present invention relates in general to the utilization of data found on legacy application screens, and particularly to a method and device for accessing data through the creation of maps of legacy applications.

BACKGROUND OF THE INVENTION

Legacy applications (computer programs running on mainframe or host computers) are usually operated through standard terminal screen interfaces, such as the TN3270 screen protocol defined by IBM and others. While legacy applications remain useful today, their character based user interfaces are difficult to use when compared with today's modern graphical user interfaces. Another problem occurs when the additional business logic needs to be added to the existing legacy applications. As a result, many programming hours are now spent updating the interfaces of legacy applications.

One way to update these interfaces is to create an application that allows the legacy application to run in an unchanged state, but allows the user to access the legacy application through a separate program operating on a personal computer or workstation. For these interfaces to work correctly, it is necessary to spoof the mainframe computer into providing the appropriate screens from which data can be extracted for the new interface. In this way, the mainframe application has no knowledge that the user is using a different front end. In addition, data entry must be allowed into the legacy application through the new interface.

In order to accomplish this, it is necessary to provide the new interface with knowledge about the terminal screens used by the legacy application. To do this, a "map" must be created of the Legacy interface that sets forth how to access the data and input locations in the legacy application. Although prior art systems exist that are capable of developing these maps, the process by which these maps are created are clumsy. Typically, a map is created only with the help of a great deal of expert knowledge concerning the organization of the legacy application and with a great deal of time and effort on the part of the programmer. What is needed is an improved system that allows the creation of maps of legacy systems with a minimum of knowledge and expertise by the end-user.

SUMMARY OF THE INVENTION

The present invention meets this need by providing a simplified method and system for mapping legacy application data.

The mapping process consists of two phases: trail recording and mapping. In the trail recording phase, the user interacts with the legacy application using a terminal emulator built into the present invention. During such a session, trail recording can be turned on, which allows the present invention to record all of the user interaction with the legacy application.

The trail recording phase can be accomplished in a single session with the legacy application. In most cases, however, multiple sessions are used to access all areas of the legacy application in which data extraction or input is desired. Each of these sessions is saved in the system as a separate trail. Where multiple sessions are used, each trail is stored separately and later combined in the map of the legacy application.

The mapping phase begins after the trails have been collected. During this phase, the present invention analyzes the trails according to specific rules that are controlled by the end user. The primary goal of the mapping phase is to be able to identify each of the terminal screens used by the legacy application and all of the relevant data found on those screens. The map must also incorporate information on how the application moves from one screen to another.

The invention is able to recognize common screens and distinguish between separate screens by applying screen identification rules. Usually, no user intervention is required to create these rules, and the mapping phase can be accomplished automatically after the trails are generated. In some cases, however, the user will find it useful to rename the screens and fields with meaningful names. In addition, for those cases where the host application exhibits complex behavior or complex data layouts, it is possible for users modify the automatically created rules and to specify additional mapping rules.

DETAILED DESCRIPTION OF THE INVENTION

The present invention assists users in creating maps of legacy application data. Once created, the maps can be used in the creation of new interfaces for old legacy applications. The maps themselves can be converted into a reusable software component such as one or more Java Beans or Enterprise Java Beans. The component can then be used by the new front-end or back-end applications to input and extract data from the legacy application.

The map that is created consists of the screens used by the legacy application, the navigational information required to traverse through the sequence of screens, and the tags and fields used to identify each legacy screen. Together, these contain all of the logic required to navigate and interact with legacy applications.

Figure 1:
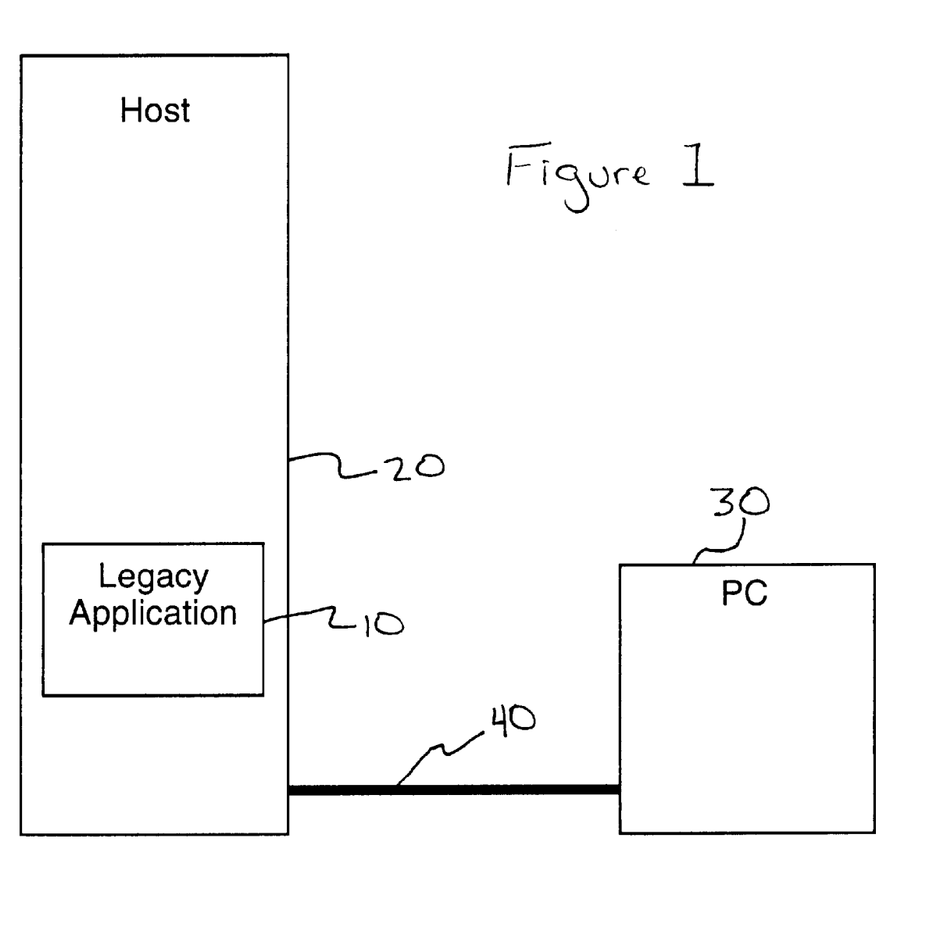
FIG. 1 is a block diagram of the environment in which the present invention is utilized.

The environment in which the present application is used is shown in FIG. 1. As shown in that figure, the legacy application 10 is operating on a host computer 20. The present invention is run on a personal computer or workstation 30 connected to the host computer 20 though a network or terminal connection 40. In the preferred embodiment, the personal computer or workstation 30 utilizes an operating system providing a graphical user interface, such as Windows NT by Microsoft.

The Mapping Process

Figure 2:
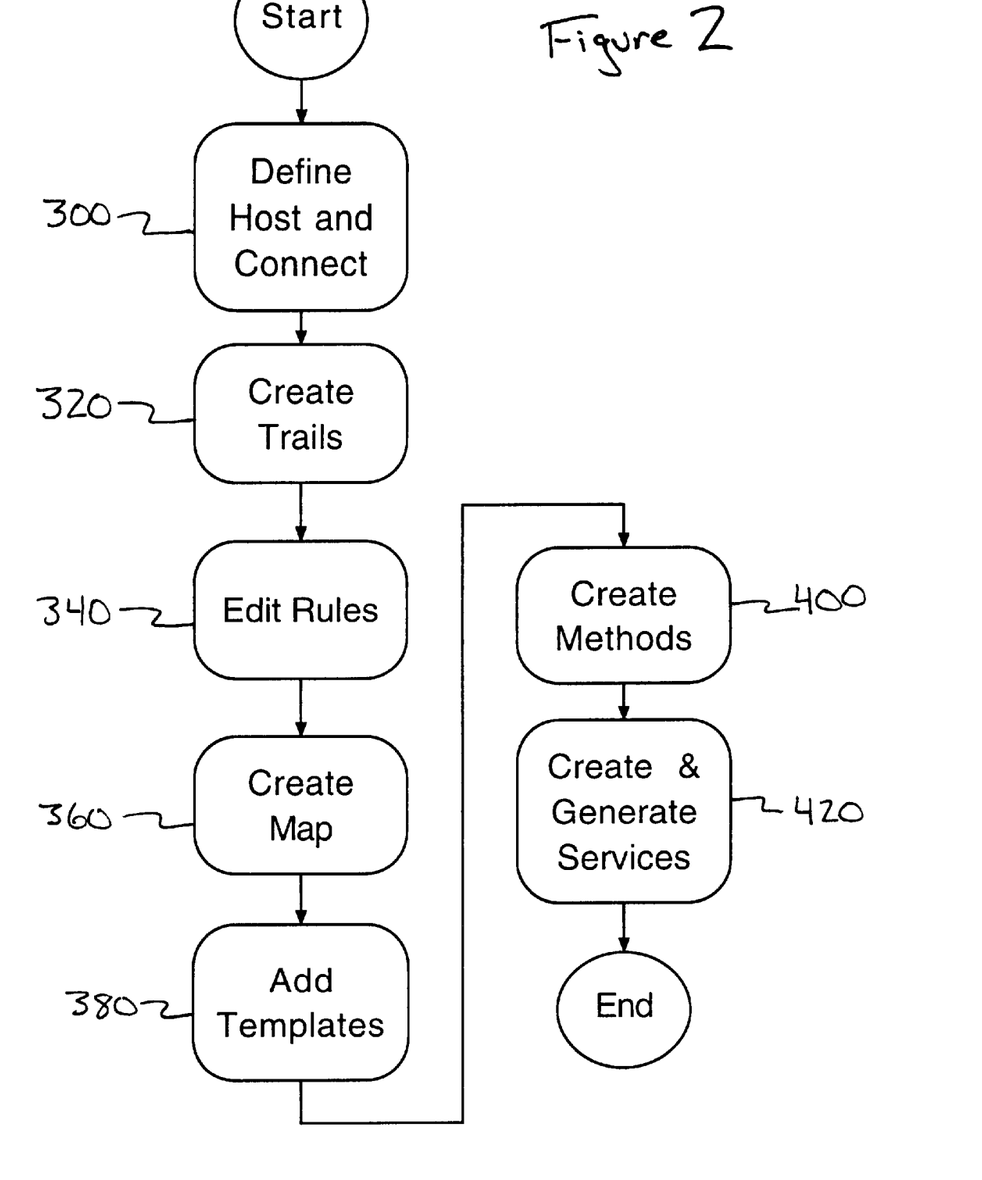
FIG. 2 is a flow chart of the basic method for creating maps of legacy applications and services that embody those maps.

The complete steps required to map a legacy application 10 and create a service that can be called by a new interface are as follows and are shown in FIG. 2:

1. define the host connection parameters and connect to the host (300);
2. create one or more trails by navigating through the legacy application 10 (320);
3. edit map creation rules as necessary (340);
4. create the map file based on the trail information (360);
5. add data templates and table templates (380);
6. create methods and identify input and output variables for the methods, as well as navigational steps that will be included in the methods (400); and
7. create services and generate that utilize the methods (420).

The present invention is concerned primarily with the creation of the map and the associated data templates. Consequently, although each of these steps will be described below, the steps for creating methods and generating services will be discussed only summarily.

User Interface

Figure 3:
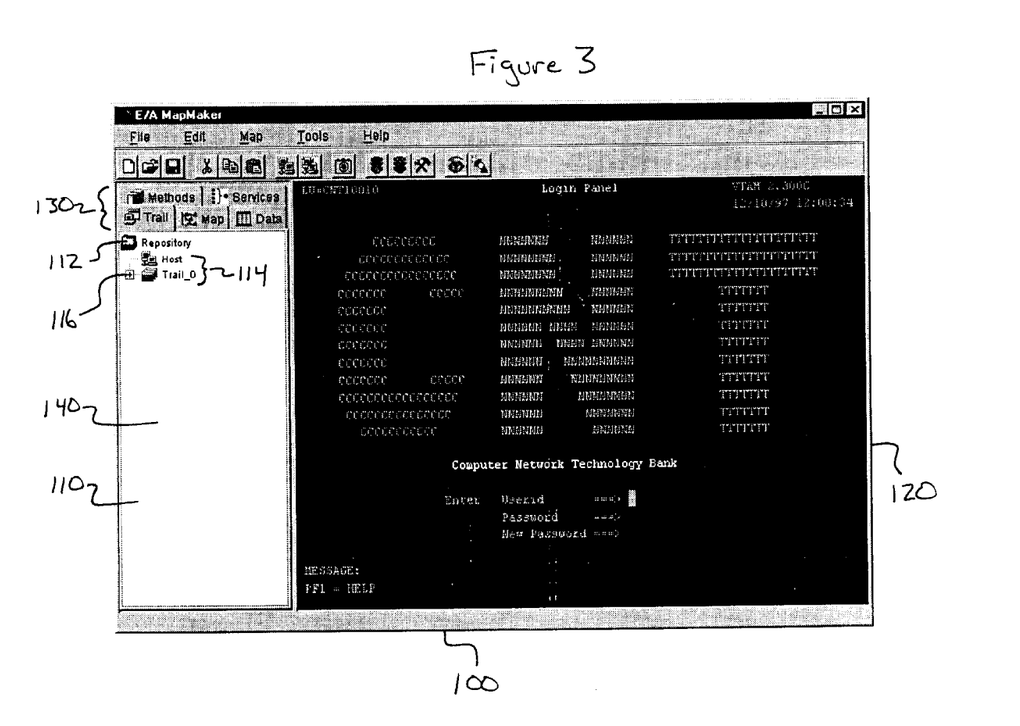
FIG. 3 is a screen display of the user interface of the preferred embodiment of the present invention including the tree view and presentation space view.

As seen in FIG. 3, the preferred embodiment of the present invention utilizes a user interface 100 having two primary panes, or views: the tree view 110 and the presentation space view 120. The tree view 110 is a graphical representation of hierarchical information, consisting of a "root" component 112 that can be expanded to expose underlying sub-components 114 (also called "nodes," or "branches"). These sub-components 114 often can be expanded as well, to reveal their own sub-components, creating a hierarchical tree format. A "+/−" expansion symbol 116 before each component in the tree identifies if the node can be expanded to reveal additional, lower-level nodes.

Figure 4:
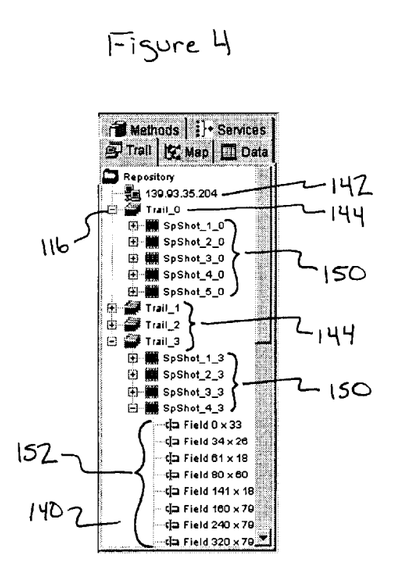
FIG. 4 is a diagram of the tree view containing the trails panel.

The tree view 110 is further delineated by "tabs" 130 that run across the top of the tree view 110. Each tab 130 represents a "tabbed panel," with each tabbed panel containing a tree view 110 of its own. There are five tabbed panels included in the interface of the preferred embodiment: the trail panel 140 (which includes the trails that are recorded during navigation of the legacy application 10); the map panel 160 (displays the map of the legacy application 10 generated using the trails and other information); the data panel 200 (used to add data templates and table templates to the screens included in the map); and the services panel 260 (used to define the services that will be generated based on the map). The trail panel 140 is shown in FIG. 4.

The right pane of the interface shown in FIG. 3 is the presentation space view 120. When connected to the legacy host and in trail recording mode, the presentation space view 120 acts as a terminal emulator allowing interaction with the legacy application. After trail recording, the saved screens can be displayed in the presentation space view 120. You can view the saved screen by clicking on the screen component 114 in one of the tree views 110. When the Data panel 180 is selected, the presentation space view 120 is also used to create data templates and table templates, as described below.

Host Connection

In order for the terminal emulator to be able to access the host legacy application 10 (as shown in FIG. 2, step 300), it is necessary to provide basic information about the host computer 20 to form a host profile. For example, the appropriate communication protocol must be selected. The preferred embodiment of the present invention supports the following protocols: TN3270/TN3270E Models 2–5; TN5250 Standard (80 column) and Large (132 column) screens; and Telnet: VT100, VT220, and VT320 (text only). Although these protocols are supported in the preferred embodiment, it would not exceed the scope of the present invention to support more or different protocols than those set forth herein. In addition to communication protocol, the host profile will include information on the host name; the correct port for the terminal server; and the IP address or DNS name of the legacy host. It is also possible to select the specific logical unit (LU) name, as explained in RFC 1647.

Trail Recording

After the host profile is defined in step 300, the user can start recording trails in step 320. A trail is a linear path of all screens encountered by the user during a session with the legacy application 10. Each trail contain the following information:

iii) a snapshot image of each screen encountered by the user, including underlying screen data; and
iv) all keystrokes typed by the user at each screen, including function keys such as PF1 or ENTER (also known as Action Identifier or AID keys).

The main goal of the trail recording phase is to expose the present invention to all the host screens that display useful data (or contain data input fields) and the path needed to reach those host screens. Trails are recorded by connecting to the host 20 and using a terminal emulator built into the presentation space 120 of the present invention to interact with the legacy application 10.

Trails are listed in the trails panel 140 of the tree view 110, as shown in FIG. 3 and in more detail with a different set of trails in FIG. 4. The trail panel 140 lists the host name or IP address 142, followed by each of the trails 144 that have been recorded. Each trail 144 can be expanded by clicking on the appropriate expansion icon 116 to view all of the screen snapshots 150 taken during the recordation of that trail 144. By default, the trails 144 are named according to the order in which they are created, but they can be renamed by the user.

Trail recording can begin at any location in the legacy application 10. Since it is usually important to access the login screen and other initial navigational information in the trail 144, the first trail recordation is usually started even before the login procedure. Subsequent trails 144 may not require the login screen. For example, trails 144 may be needed that traverse from various screens back to the main menu. In this case, the user could connect to the host first, navigate to the correct screen, and then start trail recording, perform the navigational steps, and stop trail recording when the have returned to the main menu.

Each screen snapshot 150 contains the complete screen information received from the legacy application 10, including all of the formatted fields 152 found on that screen snapshot 150. The individual fields 152 associated with a snapshot 150 can be seen simply by expanding the snapshot 150 on the trails panel 140, as shown in connection with snapshot "SpShot_4_3" in FIG. 4. Most screen protocols, such as the TN3270 protocol, directly identify the fields to the terminals, so it is a trivial matter to maintain information about all of the formatted fields 152.

If a connection with host 20 is lost during trail recording, the trail 144 will be discarded. If a trail 144 is added to the repository that is in some way incorrect, or is not needed to access information from the legacy application 10, it can be deleted or disabled without affecting any other trails. Disabled trails 144 will not be used when creating or updating a map. If a disabled trail 144 later becomes useful, it can be enabled.

Each screen snapshot 150 created during trail recordation is considered a primary document. That is, each screen encountered contains useful information that cannot be incorrect or wrong. Rather, each screen is like a fact, useful in that it contains true information about the operation of the legacy application 10. As a result, the user is not allowed to delete individual screen snapshots 150 from a trail 144. If they were, information about the navigation between screens might be lost from the invention, which would complicate the generation of the maps.

Screen Identification

Figure 5:
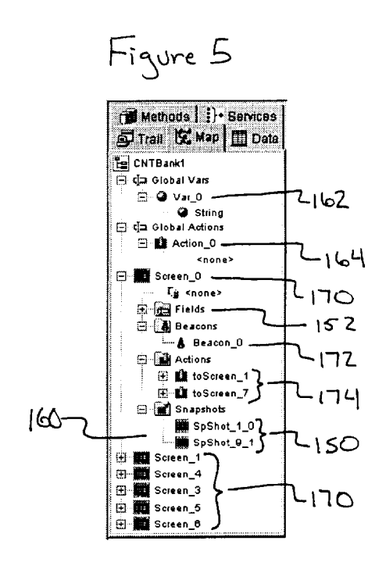
FIG. 5 is a diagram of the tree view containing the map panel.

After the trails 144 have been recorded, the next step 360 is to create a map from the trails 144. To do this, the snapshots 150 found in the trails 144 are analyzed to identify the individual screens 170 found in the legacy application 10. The map panel 160 shown in FIG. 5 shows a map that has been created from the trails 144 of FIG. 4. Once created, the map panel 160 displays the screens 170, global variables 162, and global actions 164 associated with the map. Subordinate to each screen 170 are the fields 152, tags or beacons 172, actions 174, and snapshots 150 associated with that screen 170.

The most important element in the mapping process to identify the separate screens 170 encountered in the trails 144. This identification is accomplished by analyzing the screen snapshots 150 included in the trails 144 according to screen identification rules. The default identification rules used by the present invention are simply the layout of the formatted fields 152 that are included in each screen snapshot 150. In other words, the present invention initially identifies screens 170 by noting the number, size, and location of all formatted fields 152 in a snapshot 150.

By using field number, size, and location to identify screens 170, similar snapshots 150 can be recognized as the same screen 170, even if the data presented in the snapshots 150 differs. Once a snapshot 150 is analyzed, later snapshots 150 are reviewed to see if they contain the same fields 152 in the same location. If so, the latter snapshot 150 is considered to be another instance of that first screen 170. If there is no match, the latter snapshot 150 is considered an independent screen 170. In this manner, all snapshots 150 found in the trails 144 are divided into separate screens 170, with some screens 170 related to multiple snapshots 150.

Unfortunately, the default screen identification rules which rely only on the number and location of formatted fields 152 do not always correctly identify the separate screens 170. In some cases, screens 170 may contain no formatted fields 152. One example of this is a Telnet formatted screen, since Telnet screens do not have any formatted fields 152. Another problem situation is where two different screens 170 have the same layout of formatted fields 152. In these types of situations, the user is allowed to identify additional screen identification rules (step 340 in FIG. 2).

Additional screen identification rules are created by using tags or beacons 172 that identify a selected area on the screen 170 that contains unique information. Unlike the field comparison of the default identification rules, which use only field number, position, and size to determine a screen match, tags 172 use alphanumeric characters contained in the selected area to determine the screen identity.

In practice, tags 172 will be added where two snapshots 150 have been inappropriately been identified by their fields 152 as the same screen 170. A user can assign as many tags 172 to a screen 170 as are necessary to uniquely identify that screen 170.

A tag 172 can be added to distinguish between the two screens 170 interactively. The presentation space view 120 displays the first snapshot 150 associated with a screen 170 when the screen 170 is selected in the map panel 160. A mouse or other input device can then be used to select a unique area on the presentation space view 120. The selected area will be surrounded by a visual selection box, which the user can use to create the tag 172.

Each tag 172 can be allowed to float. For instance, if the tag 172 is allowed to float freely, a match is found if the selected text is found anywhere on the screen snapshot 150. The tag 172 also can be restricted to an exact row and column location, or can be allowed to float anywhere on a specified row or column.

Another method for customizing screen identification is to disable some of fields 152 used for matching. By default, all fields 152 are used for screen matching. In some cases, however, this default will cause screen snapshots 150 that share the same purpose (and hence should be considered the same screen 170) to be considered different simply because one field 152 of the snapshots 150 does not appear on every screen. By disabling one or more of the fields 152, the user can reduce the matchset, so that snapshots 150 with subtle differences will be recognized as the same screen 170.

If a tag 172 is created for a screen 170, it is sometimes appropriate to let the tag 172 be the only test for that screen 170—if the tagged text is present, the snapshot 150 is always identified as an example of the screen 170. If this behavior is desired, all of the fields 152 associated with the screen 170 should be disabled.

After the new screen identification rules have been set up, as described above, it is necessary to regenerate the map under the new rules.

Actions

In addition to identifying screens 170 in a legacy application 10, the present invention must also determine how to move between screens 170 in order to complete the map. The movement between the screens 170 is also determined by analyzing the trails 144, and is recorded as an action 174 in the map. Each action 174 embodies the knowledge that when certain keystrokes are submitted to the legacy application 10 at one screen 170, the legacy application 10 will respond by supplying a known new screen 170.

During trail recording, the present invention stores with a particular screen snapshot 150 all the keystrokes entered by the user during that snapshot 150, including any AID key pressed to complete the operation. During mapping, the keystrokes stored with a snapshot 150 are grouped into an action 174 that is associated with the identified screen 170. The actions 174 also record which new screen 170 was presented by the legacy application 10 after these keystrokes were entered. If during the mapping, the same keystrokes were used to move between the same two screens multiple times, these multiple occurrences of keystrokes would be grouped into a single action 174.

If a screen 170 were viewed multiple times during trail recording, various snapshots 150 would be created. It is possible that the keystrokes stored with each snapshot 150 result in different succeeding screens from the legacy application 10. Thus, each unique set of keystrokes is stored as a separate action 174, with each action possibly being associated with a different succeeding screen 170. Because multiple actions 174 can be associated with a screen 170, the invention supplies a descriptive default name to an action 174 such as toFirstScreen or toSecondScreen. To make these names make more sense to the user, these and other names created by the invention can be altered as desired.

Often, the keystrokes recorded with an action 174 determine the information that is contained in the next screen 170. For example, a customer look-up screen will allow the entry of the customer's name. The next screen would then supply data about the customer whose name or customer number was entered. In these circumstances, the actual keystrokes recorded in an action 174 should be replaced with a variable. By doing so, the invention could be used to create software components (i.e., JavaBeans) that can interact with other code to look up any customer rather than merely the customer whose name was entered during trail recording.

In order to use a variable in an action 174, a global variable 162 must be defined for the map. This global variable 162 can then be used by an action 174. When a new global variable 162 is created by the user, it is added to the map panel 160. The new variable 162 can be renamed by the user. Each global variable 162 has three properties: name (the name of the global variable), default value (the text string that will be used as the default input value for the variable) and used by (a list of actions and/or method variables that use this variable which is automatically generated when the data fields are defined).

Each action 174 has a variety of properties. These properties can be divided into input properties 180 (shown in the input properties screen 178 on FIG. 6) and destination properties 190 (shown in FIG. 7). The input properties 180 define the information needed to correctly identify and perform the action 174. In contrast, the destination properties 190 are used to identify information about the screen that is accessed after the action 174 is performed.

As explained above, the action 174 has associated with it keystrokes 181 (shown on the properties screen 178 in FIG. 6 as "Data/Prefix") and an AID key 182, which are two of the input properties 180. The AID key property 182 identifies the AID key used to complete the action 174. The "Use for Match" option can be deselected if the particular AID key 182 is not used to identify the action, meaning that another AID key 182 could be used instead in the same action. A global variable 183 can also be used in place of the keystrokes 181. If both a global variable 183 and the keystrokes properties 181 are set, then the keystrokes property value 181 will be prepended to the value of the global variable 183. Of course, other combinations of the keystrokes 181 and the global variable 183 are possible and within the scope of the present invention.

Figure 6:
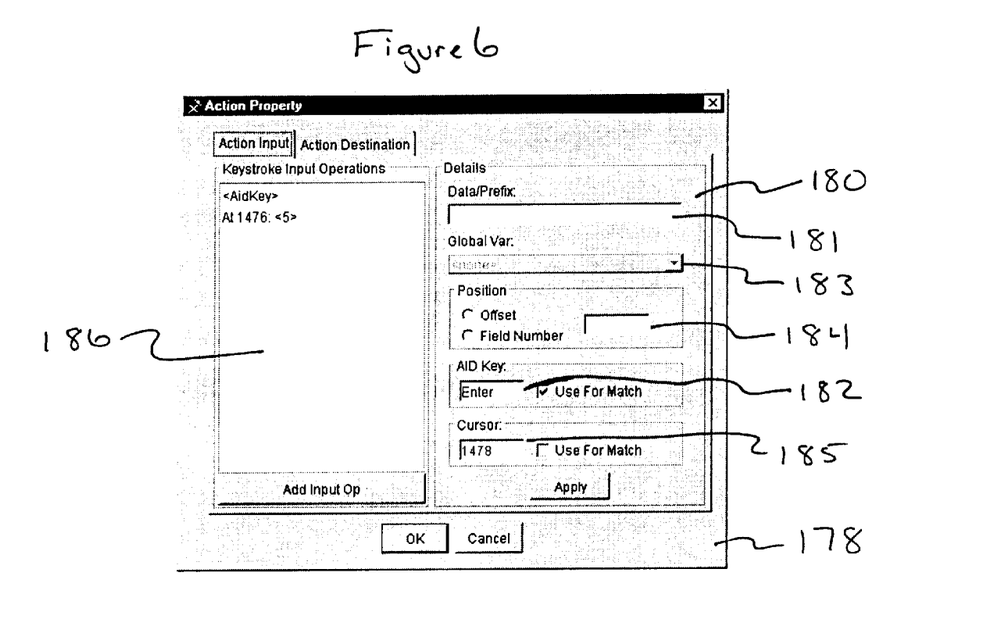
FIG. 6 is a screen display of the actions input properties screen.

An additional input property 180 for an action 174 is the position property 184. This represents the position on the legacy screen 170 where the data will be input. This can be identified by the position (offset) or the field number. Finally, the cursor position property 185 stores the position of the cursor when the AID key was pressed. This is an important property 180 because applications will often behave differently depending on the cursor position at the moment when AID Key was pressed. For example, the user can be presented with the list of available transactions. To select from the list, the user is to place the cursor on the desired transaction hit Enter. With applications such as this, the position of the cursor 185 is needed as an input property and the "Use as Match" option should be selected so that cursor position is used in action matching.

Figure 7:
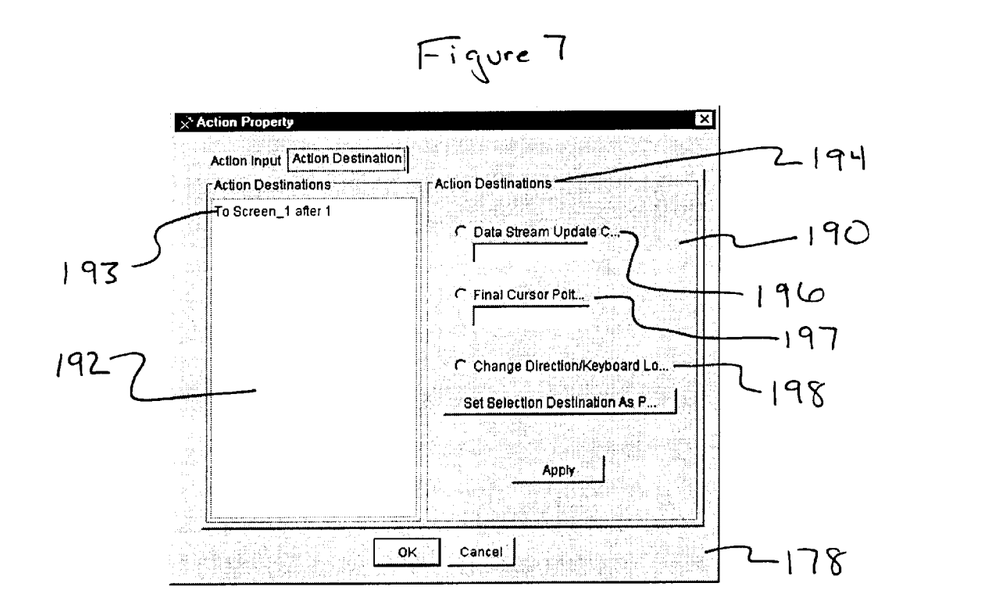
FIG. 7 is a screen display of the actions destination properties screen.

As seen in FIG. 7, the destination properties 190 are the destination list 192, and the destination determination 194. The destination list 192 is an expandable list of all destination screens 193 that are received as a result of this action 174, since it is possible that multiple screens 170 will be navigated to after the action 174 is complete. Typically one of the destinations 193 is selectable as the primary destination for the action 174.

The destination determination property 194 is used to select how the action will determine it has reached the destination (or primary destination) 193. The three choices are the data stream update count 196, the final cursor position 197, and the change direction/keyboard lock 198. The data stream update count selection 196 simple counts the number of data stream updates required from the host 20, with a default of one screen. The final cursor position choice 197 has the invention wait until the cursor is in the selected position until the action is considered complete. Finally, the change direction/keyboard lock choice 198 waits for a change direction or a keyboard lock from the legacy application 10 before considering the action to be complete.

Global Actions

Often during regular interaction with the host application 10, some user activity causes the application 10 to become in an unknown or unexpected state. Many host applications 10 have an AID key that will return the user to a known place in the application 10. For example, an application 10 may have the PF3 key assigned to always return the user to the main menu. If this is the case, the user can assign a global action 164 that can be a default mechanism that will always return the application 10 from an unknown state to a known state.

When a new global action 164 is created, it is added to the tree display, sub-ordinate to the global action label, as seen in FIG. 5. Global actions 164 have the same properties as do regular actions.

Templates

Although formatted fields 152 identified by the screen protocol were used to divide screen snapshots 150 into screens 170, these fields 152 are not automatically available as data to the user interface using the map. Instead, standard or data templates 210 and table templates 220 are used to extract data from the screens 170 received from the legacy application 10. The establishment of these templates 210, 220, is step 380 in FIG. 2.

Figure 8:
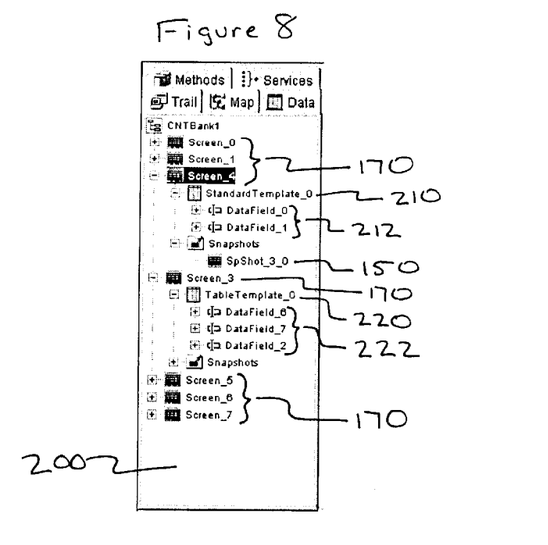
FIG. 8 is a diagram of the tree view containing the data panel.

These templates 210, 220 are viewed and modified using the data panel 200 in the tree view 110, as shown in FIG. 8. This panel 200 displays all of the screens 170 associated with the map. Sub-ordinate to each screen 170 on the data panel 200 are data or standard templates 210 and table templates 220. Sub-ordinate to data templates 210 are the static data fields 212 defined by the data template 210. Sub-ordinate to the table templates 220 are the repeating data fields 222 (fields in a table on the legacy screen 170) defined by the table template 220.

Data templates 210 provide access to the static data fields 212 found in the legacy application 10. Static data fields 212 are those data elements that have a single occurrence per screen 170 and are generally related on a one-to-one basis with a data record. They typically will appear at the exact same row and column position on a screen 170, although they can float. Floating data elements are handled in the present invention by anchoring them to a floating tag 172 instead of a fixed screen location. Each data template 210 represents an entire host application screen 170 and serves as a general container for the static fields 212 on that screen 170.

Most static fields 212 are added to the data template 210 merely by selecting a preformatted field 152 shown in the presentation space view 120 when a screen 170 is selected from the data panel 200. Fields 152 that were recognized by the invention are selected automatically by double-clicking on the field 152. Some data may not be recognized by the invention since the screen protocol did not identify the data as a formatted field 152. This data can be selected by defining an area on the presentation space view 120 through a pointing device such as a mouse. As with other elements in the present invention, static data fields 212 can be renamed from their default names to make the names more meaningful.

Each static field 212 in a data template 210 can be used to automatically set the value of a global variable 162. This is done by setting an UpdateVar property associated with each static field 212. By setting this property to the selected global variable 162, the global variable 162 is reset to the value of this field 212 every time the screen 170 is received.

Table templates 220 are used to define tabular, repeating data fields 222 that are contained on the legacy screens 170. Table templates 220 are similar to data templates 210, except that they do not encompass the entire screen 170. Instead, table templates 220 are used to group repeating data fields 222 found in a portion of the screen 170.

Figure 9:
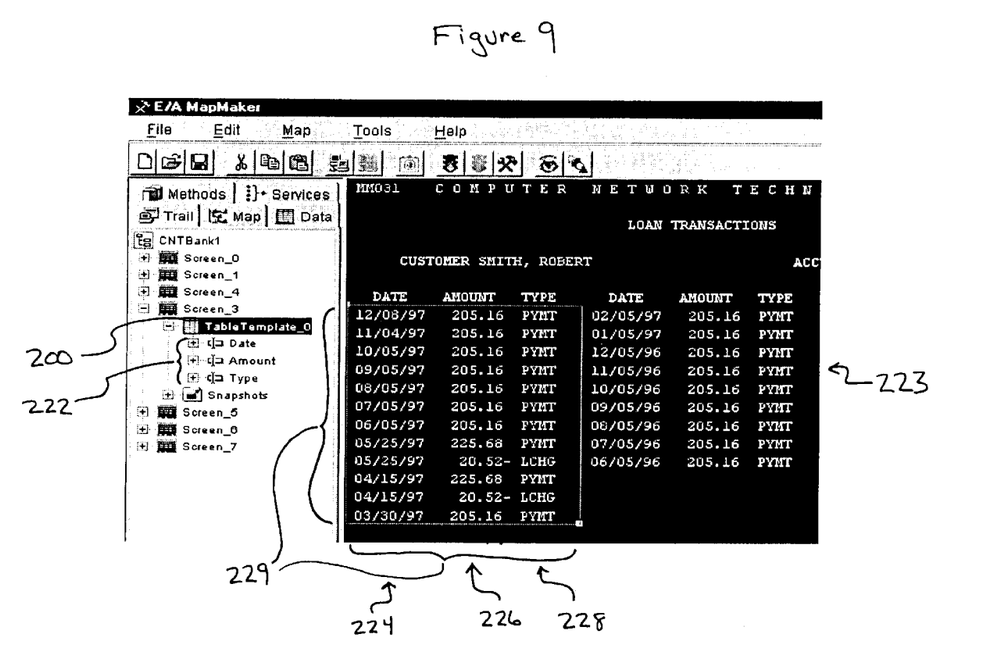
FIG. 9 is a screen display of the present invention showing the data panel tree view and a legacy application having table data in the presentation space view.

An example of this type of data can be seen in FIG. 9. In this figure, the screen 170 displayed in the presentation viewspace 120 contains a table of data 223 relating to payments on a loan, including the date 224, amount 226, and type of transaction 228. These columns 224, 226, 228 are then repeated a second time.

To define the table template 220, the user must select the area 229 defining the table 223 in the presentation space view 120 with a pointing device. After specifying the area 229 containing the table 223, individual repeating fields 222 are mapped by selecting the data in the presentation space view 120 and then adding the field 222 to the table template 220. One repeating field 222 is selected from the top row of each column 224, 226, 228.

Figure 10:
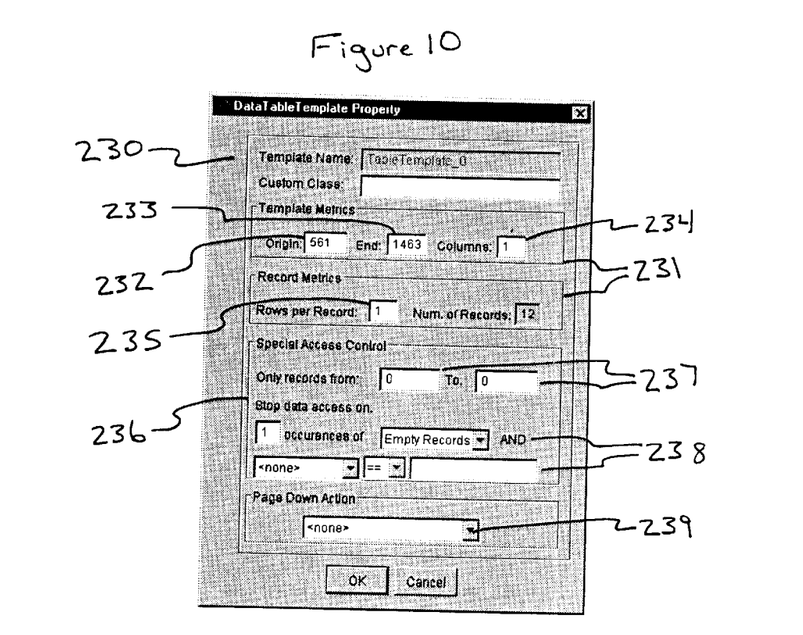
FIG. 10 is a screen display of the table template properties screen.

The properties of a table template 220 are shown on the table template properties screen 230 shown in FIG. 10. The most important of the properties is the metrics 231 of the template 220. The metrics 231 describes the overall dimensions of the table template 200. In addition to the origin 232 (screen location of the beginning of the table 223) and the end 233 (screen location of the end of the table 223) properties, the metrics 231 also describe the number of columns 234 and rows per record 235 in the table 223. The number of columns 234 indicates how often the repeating data fields 222 that represent a single record repeat in multiple columns across the screen 170. An example of a table 223 with two columns of repeating data can be seen in FIG. 9, which shows that columns showing the date 224, amount 226, and type 228 data appear twice on the same screen 170.

The rows per record 235 indicates the number of rows used to display each record in the table 223. Generally, most tables 223 in legacy applications 10 have one row per record. However, there are some applications that have one or more empty rows after each record. In this case, this value 235 indicates the number of rows included in each record.

The record access properties 236 of the table template 220 specify when the invention should stop retrieving records. The Only Records From portion 237 of the record access properties 236 allows the template 220 to select only a limited range of records. For instance, the Only Records From property 237 could specify that only records 1 from 20 should be retrieved, or only records from 20 to 100 should be retrieved. Alternatively, the record access properties 236 could indicate at 238 that records could stop being retrieved after one or more occurrences of empty records or repeated records. The user could also create a test at 238 that retrieves data until a particular match is found, such as a global variable 162 containing the message "end records."

Finally, the user can also instruct the invention whether and how to "scroll" down to the next page of records using the page down action property 239. If this is the only screen that will contain records, no scrolling is needed. If there are additional screens that will contain records, the user can select the appropriate action 174 that will lead to the next screen 170.

Methods

Figure 11:
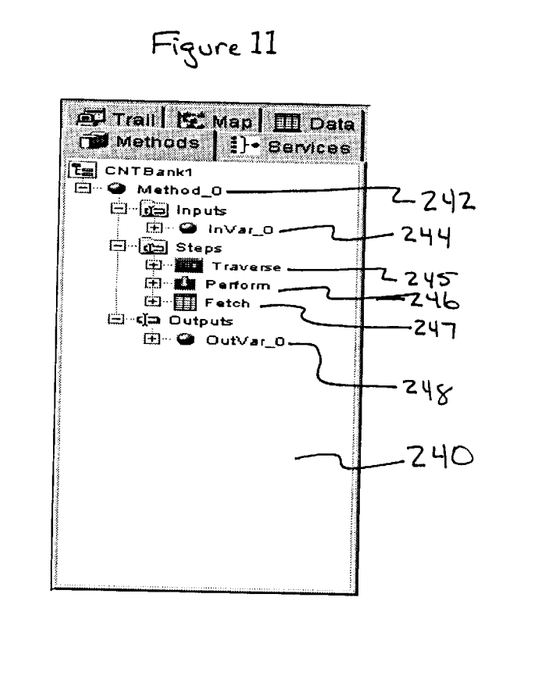
FIG. 11 is a diagram of the tree view containing the methods panel.
Figure 12:
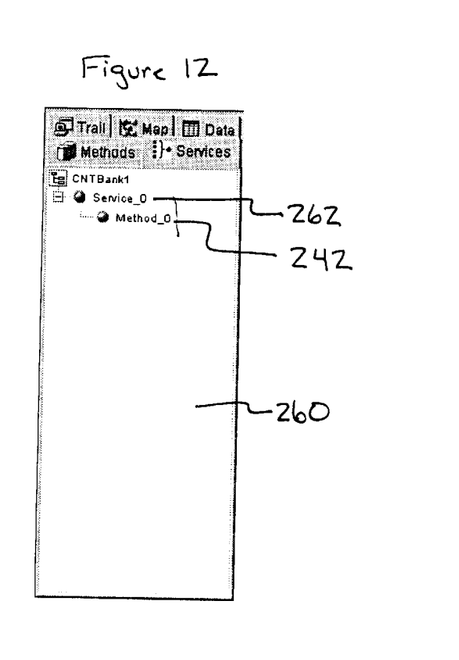
FIG. 12 is a diagram of the tree view containing the services panel.

The method panel 240 is shown in FIG. 11. A method is a logical grouping of screen transitions, navigational information, and input and output variables. It is methods that actually retrieve data from or input data to the legacy application 10. After methods are defined (step 400 of FIG. 2), they are grouped together into one or more services that will execute the methods (step 420).

The method panel 240 displays methods 242, as well as the input variables 244, steps 245–247, and output variables 248 associated with each method. Briefly, a method 240 is capable of retrieving certain output variables 248 from the legacy application 10 based on the value of the input variables 244 by following the steps 245–247.

Input variables 244 are used to pass variable information into fields 212, 222 defined in templates 210, 220 for the legacy application 10. Each input variable 244 is predefined to a specific type, such as a String, Integer, Date, or Double-byte variable. Each input variable 244 is also associated with a single global variable 162. The global variable 162, in turn, is associated with an action 174. The action 174 is then associated with a traverse method step 245 or a perform method step 246, as explained below.

Output variables 248 are used to extract (or "scrape") specific information from information found on the screens 170 of the legacy application 10. More specifically, output variables 248 identify the fields 212, 222 that the methods 242 will be using to extract data from the legacy application 10. Using the fetch method step 247 described below, these fields 212, 222 are mapped to data in the legacy application 10 as defined in a data or table template 210, 220. Like input variables 244, output variables 248 are predefined to be a specific type. Output variables 248 can also be enabled or disabled so that an individual instance of the method 242 will not use the output variable 248.

Method steps 245–247 represent the actual activity performed by the method, such as screen traversal, inputting variable data into fields, and extracting returned data from fields. Three types of method steps are available: traverse steps 245 (to navigate to a specified screen); perform steps 246 (to perform a specified action); and fetch steps 247 (to extract data from the screen 170).

Traverse steps 245 instruct the method 242 to traverse from the current screen 170 to another screen 170. The first step in a method 242 will always be a traverse step 245, because the method 242 must first navigate to a specified screen 170 before it can perform any other activity. The information required to perform the traversal is contained in the map, so all that is required is to identify the desired screen 170.

Perform method steps 246 instruct the method 242 to perform a specified action 174, usually to input a global variable 162 into the screen 170 associated with the action 174, and then execute the AID key 182 associated with the action 174. Perform steps 246 execute an action 174 on the current screen 170, or execute global actions 164. The information about the action 174, 164, such as the global variable 162 and the AID key 182 to be executed, is contained in the map, so all that is required is to identify the desired action 174. Assigning a global action 164 to a method 242 allows the creation of an "on fail" method. In this way, any method steps 245–247 that return a failure can transition the application back to a known state.

Fetch steps 247 instruct the method 242 to extract data from the specified data template 210 or table template 220 where the specified field 212, 222 from the template 210, 220 has been defined as an output variable 248. Output variables 248 must be created to identify specific fields 212, 222 from which data should be extracted.

Services

The services panel 260 is shown in FIG. 11. The services panel 260 displays services 262, as well the methods 242 associated with the services 262. Services 262 are a grouping of one or more methods 242. Services 262 serve as the interface between the methods 242 and the environment that actually creates the new end user interfaces. It is the services 262 that are compiled into a reusable software components such as Java Beans. Clients can then invoke these compiled services in order to execute the method steps 245–247 contained within the methods 242.

Custom Classes

The screen 170, action 174, data template 210, and table template 220 are classes found in the compiled services 262. By creating these elements as classes in the generated services 262, the present invention allows programmer customization through the use of custom subclasses. To define custom behavior, it is possible to overwrite some of the methods of the components.

CONCLUSION

It is to be understood that the above description is intended to be illustrative, and not restrictive. The invention is not to be taken as limited to all of the details of this description, as modifications and variations thereof may be made without departing from the spirit or scope of the invention. Many other embodiments will be apparent to those of skill in the art upon reviewing the above description. For instance, although the present invention is described with an integrated terminal emulator, it would not be beyond the scope of the invention to separate the terminal emulator and merely record interaction between the legacy application and a terminal or an external terminal emulator. The scope of the invention should, therefore, be determined with reference to the appended claims, along with the full scope of equivalents to which such claims are entitled.

What is claimed is:

1. A method for mapping data in a legacy application comprising:
   a) using a terminal editor for a session with the legacy application;
   b) recording snapshots of all screens received by the terminal editor;
   c) forming a trail for the terminal session, each trail including a snapshot of each screen accessed; and
   d) using screen identification rules to recognize snapshots that are the same screen.

2. The method of claim 1, further comprising the step of:
   e) repeating steps a through c as necessary to access all screens containing data fields that are needed for the map.

3. The method of claim 1, wherein the step of using screen identification rules comprises the sub-steps of:
   i) identifying preformatted fields in the screen snapshots received by the terminal editor; and
   ii) dividing snapshots into screens according to the preformatted fields.

4. The method of claim 3, wherein snapshots are divided into screens by examining the number, size, and location of the preformatted fields.

5. The method of claim 3, wherein the step of using screen identification rules further comprises the sub-step of:
   iii) identifying tags of alphanumeric text found on the snapshots; and
   iv) dividing snapshots into screens according to tags.

6. The method of claim 1, wherein the step of using screen identification rules further comprises the sub-steps of:
   i) identifying tags of alphanumeric text found on the snapshots; and
   ii) dividing snapshots into screens according to tags.

7. The method of claim 1 further comprising the steps of:
   f) recording all keystrokes sent to the legacy application during the session with the legacy application;
   g) including in each trail the keystrokes typed during a particular snapshot and the resulting screen snapshot that was received by the terminal editor after those keystrokes were typed; and
   h) generating actions associated with each screen indicating all keystrokes entered and a resulting screen.

8. The method of claim 7, wherein the step of using screen identification rules comprises the sub-steps of:
   i) identifying preformatted fields in the screen snapshots received by the terminal editor; and
   ii) dividing snapshots into screens according to the preformatted fields.

9. The method of claim 8, wherein snapshots are divided into screens by examining the number, size, and location of the preformatted fields.

10. The method of claim 9, wherein the step of using screen identification rules further comprises the sub-step of:
    iii) identifying tags of alphanumeric text found on the snapshots; and
    iv) dividing snapshots into screens according to tags.

11. The method of claim 7, wherein the step of using screen identification rules further comprises the sub-steps of:
    i) identifying tags of alphanumeric text found on the snapshots; and
    ii) dividing snapshots into screens according to tags.

12. The method of claim 7, further comprising the steps of:
    h) associating a template of data fields with each screen.

13. The method of claim 12, wherein the template defines a table of repeating fields.

14. The method of claim 12, further comprising the step of:
    i) creating a reusable software component containing a map of the legacy application, the map including the screens, the actions indicating the keystrokes necessary to move to a next screen, and the template of data fields available on the screens.

15. A software program capable of operating on a CPU containing an graphical user interface, the CPU in communication with a legacy application on a host computer through a terminal editor, the program comprising:
   a) a recording mechanism for recording trails, the trails containing
      i) screen snapshots received by the terminal editor;
      ii) formatted fields found in the screen snapshots, and
      iii) keystrokes entered at each screen snapshot;
   b) a map creation mechanism for creating a map of the legacy application, the map containing
      i) individual screens identified from the screen snapshots according to screen identification rules, and
      ii) one or more actions associated with each screen, the actions containing keystrokes entered at each screen and a destination screen.

16. The software program of claim 15, wherein the screen identification rules comprise the arrangement of formatted fields found in the screen snapshots.

17. The software program of claim 16, further comprising:
   c) a tag identification interface for selecting a region of alphanumeric text to comprise part of the screen identification rules.

18. The software program of claim 15, further comprising:
   c) a data field template interface for identifying data fields in the legacy application.

19. The software program of claim 18, further comprising:
   d) a method creation interface for creating methods that exchange data with the legacy application.

20. The software program of claim 19, further comprising:
   e) a service creation mechanism to generate reusable software component services containing one or more methods.

21. A system for mapping a legacy application comprising:
   a) a host computer operating a legacy application;
   b) a data connection in communication with the host computer;
   c) a CPU operating a graphical user interface and in communication with the data connection, the CPU having:
      i) trail recordation means for recording trails of interaction with the legacy application;
      ii) map creation means for creating a map of the legacy application based upon screen identification rules.

22. The system of claim 21, wherein the CPU is a workstation.

23. The system of claim 21, wherein the CPU further comprises:
   iii) a terminal editor to interact directly with the legacy application.

24. The system of claim 21, wherein the CPU further comprises:
   iii) generation means for generating a reusable software component containing the map.

\* \* \* \* \*